Sept. 10, 1929.
F. W. PRO
1,727,616
FIELD ENSILAGE CUTTING MACHINE
Filed Oct. 23, 1926
5 Sheets-Sheet 3
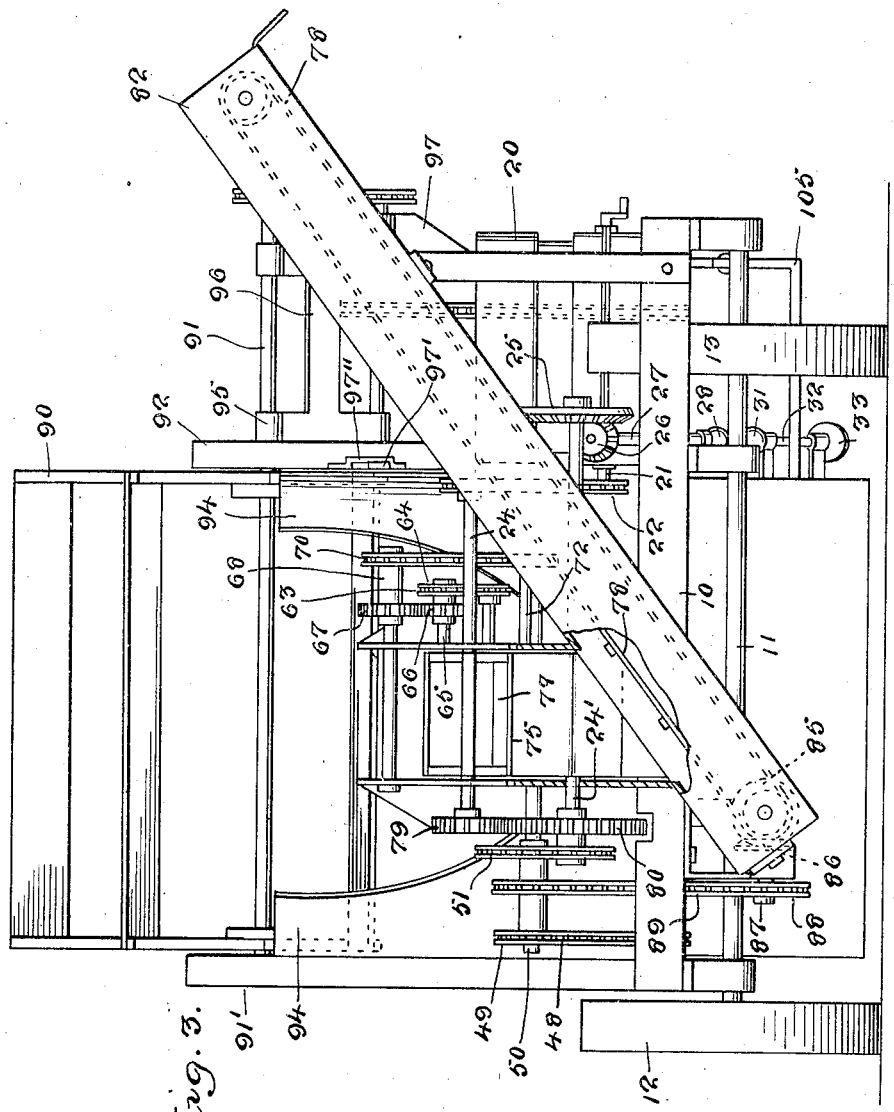
Frank W. Pro
INVENTOR
BY Victor J. Evans
ATTORNEY
WITNESS:

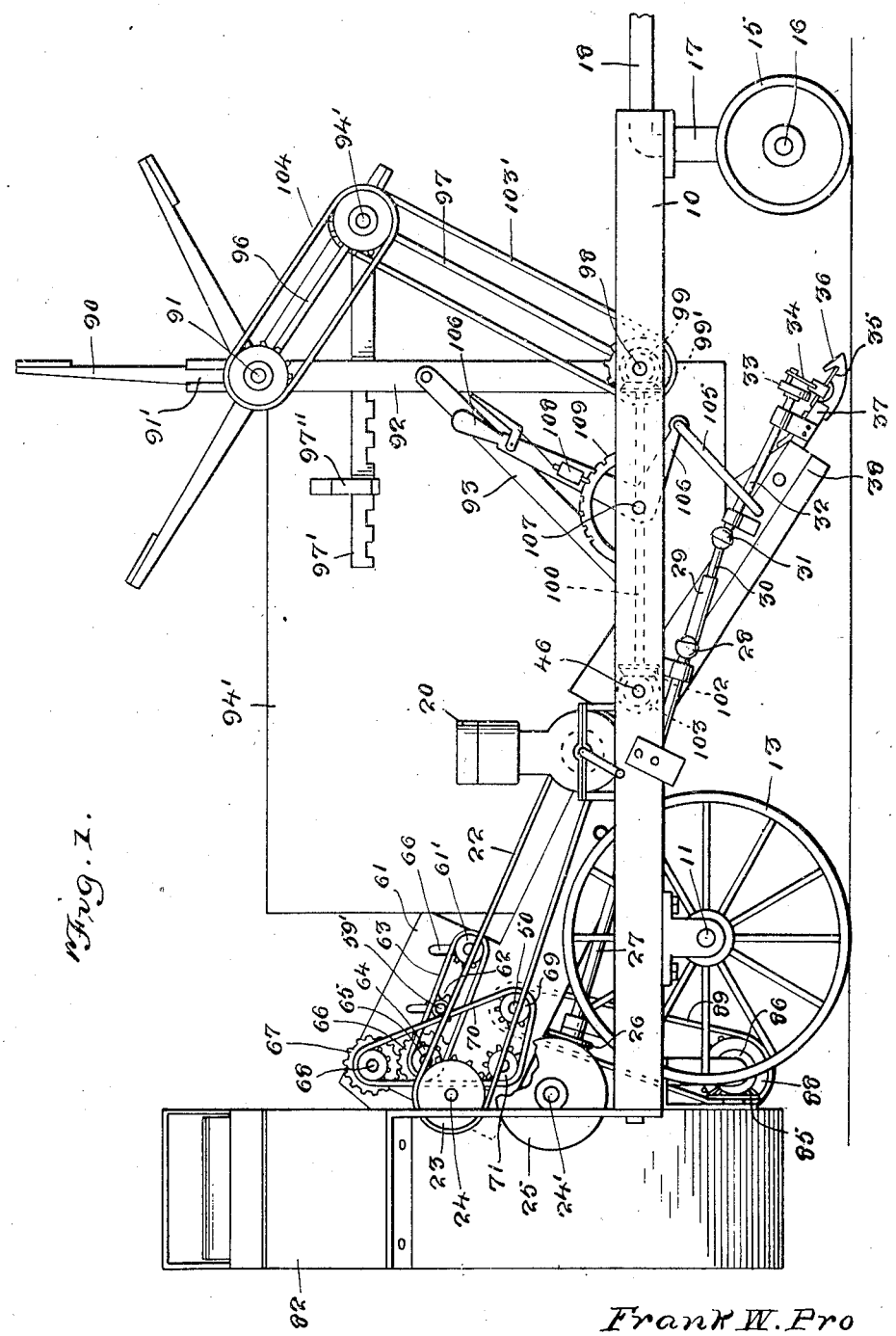

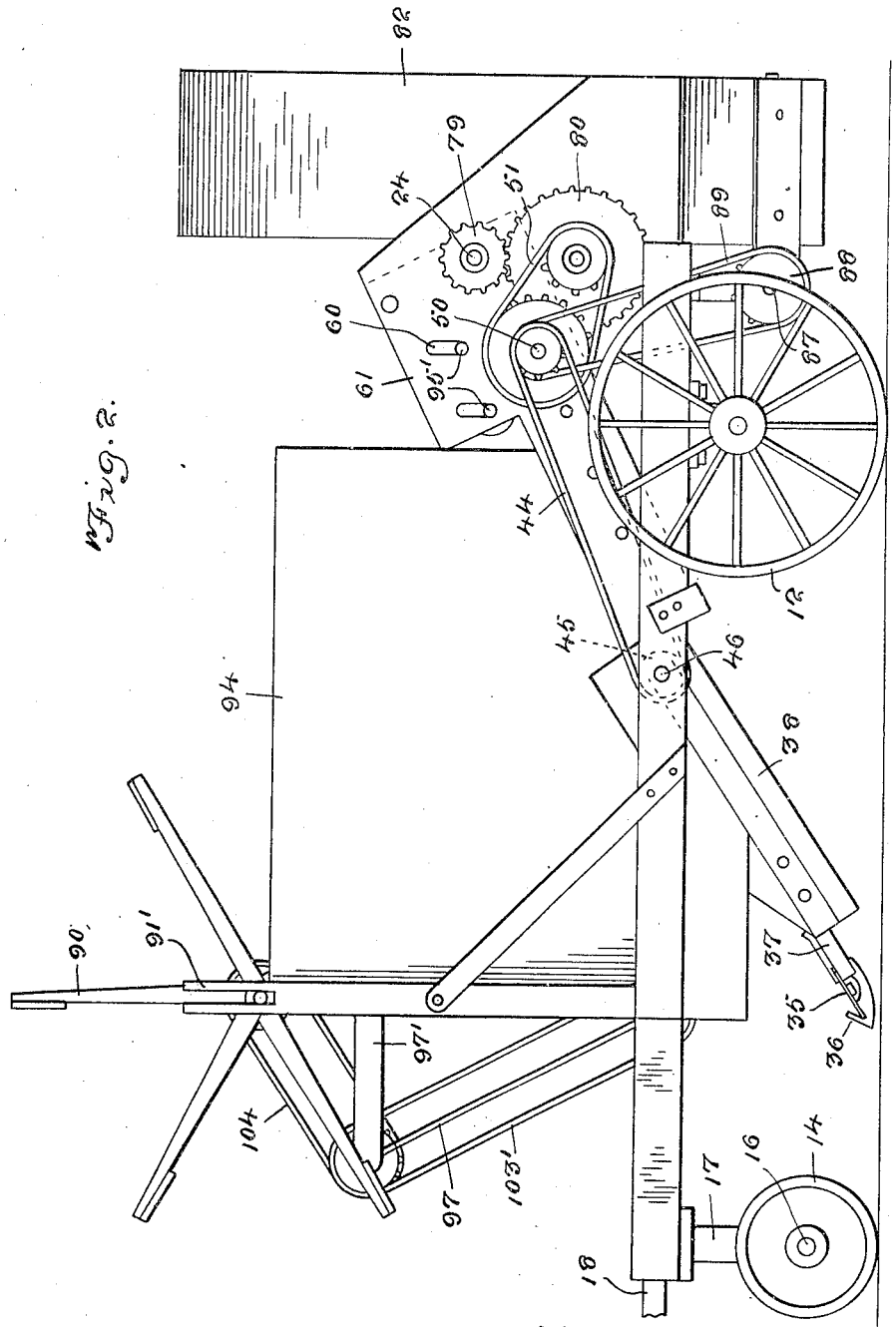

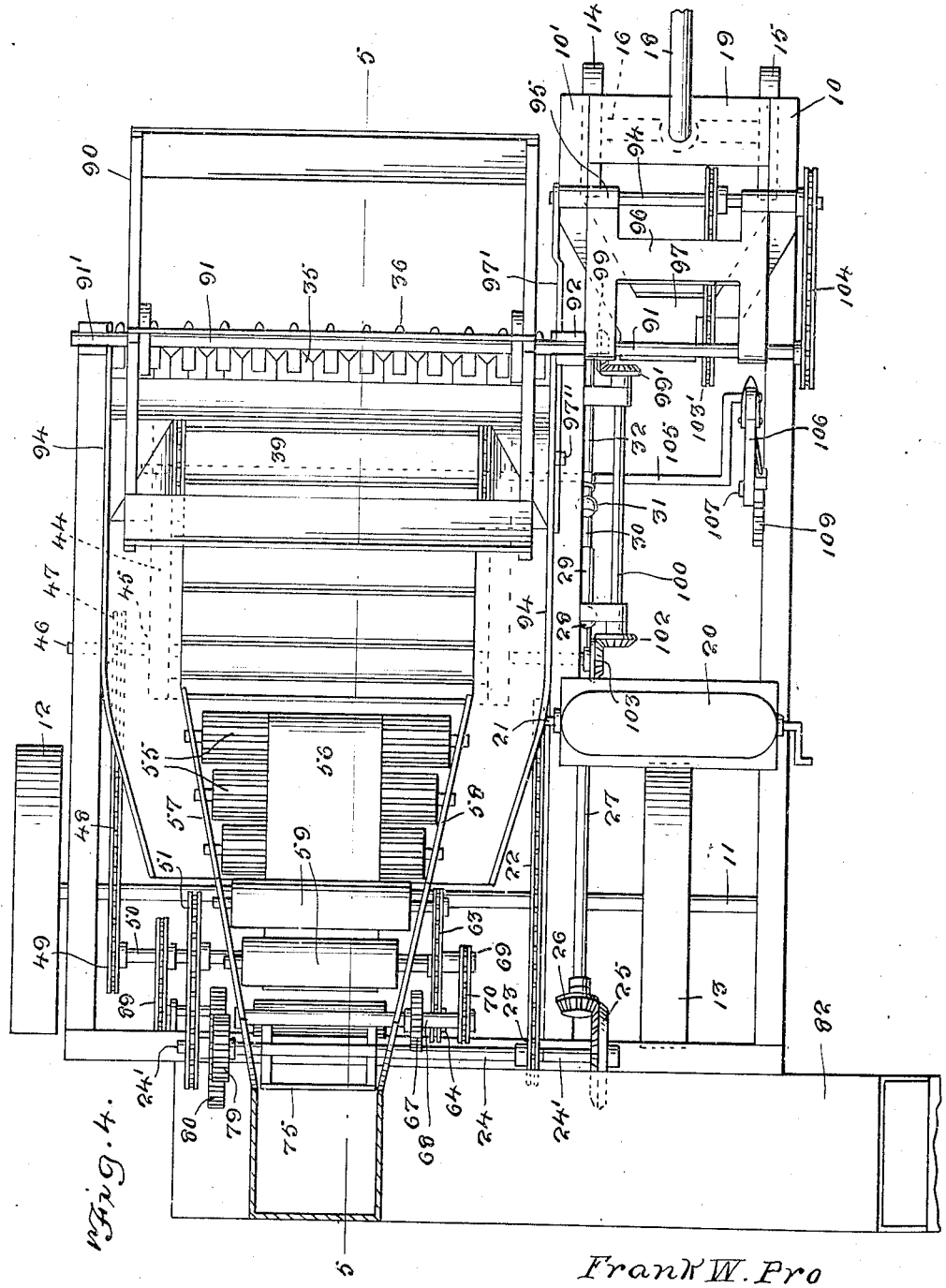

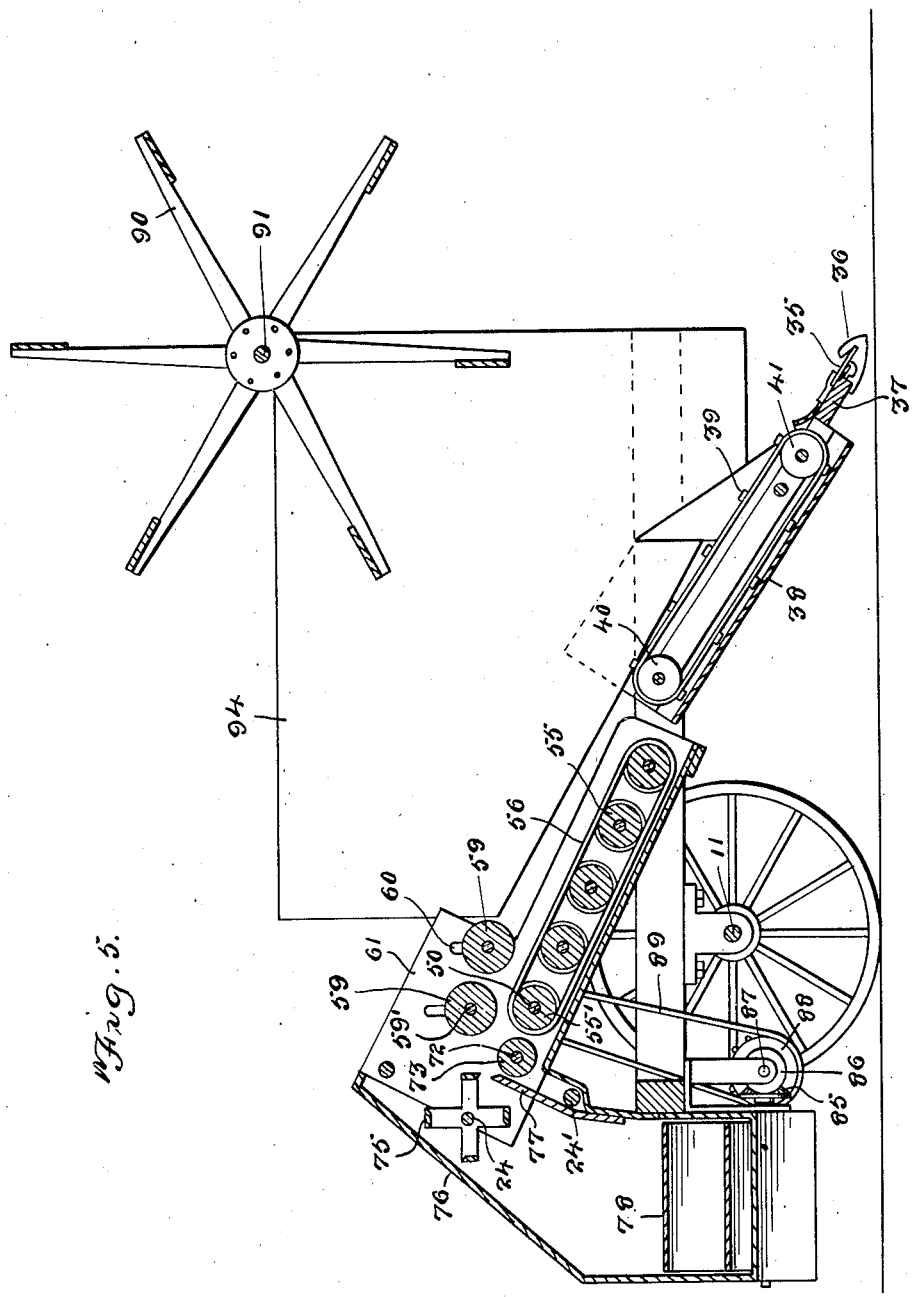

Patented Sept. 10, 1929.

1,727,616

UNITED STATES PATENT OFFICE.

FRANK W. PRO, OF KINGMAN, KANSAS.

FIELD ENSILAGE-CUTTING MACHINE.

Application filed October 23, 1926. Serial No. 143,752.

The object of this invention is to provide means adapted to cut the standing stalks, special means for feeding and conveying the stalks rearwardly and converting them into ensilage, and delivering the material to an elevator for discharge to a wagon or truck by which they are carried to the silo.

A further object is to provide a special arrangement of driving mechanism.

A further object is to produce a machine by the use of which all of the substance and food value in the green stalks and leaves or foliage may be saved, and a machine which may be manufactured at less cost than many of those in use at the present time.

With the foregoing and other objects in view, the invention consists in the novel construction and arrangement of elements described, illustrated and claimed, it being understood that modifications may be made within the scope of the claims without departing from the spirit of the invention.

In the drawings forming part of this application,

Figure 1 is a view of the machine in elevation, from the right-hand side thereof.

Figure 2 is a view in elevation, showing the opposite side of the machine.

Figure 3 is a rear elevation.

Figure 4 is a top plan view.

Figure 5 is a vertical longitudinal section, the section being on line 5—5 of Figure 4.

The main frame 10 is carried on a rear axle 11, which in turn mounts rear wheels 12 and 13, and the forward portion of the machine is carried on a truck including wheels 14 and 15 carried by axle 16 mounted in element 17 with which tongue 18 has connection, the downwardly extending portion of the tongue being rotatable with reference to transverse brace 19 secured to a side element of frame 10, and to a longitudinal element 10' of the frame.

An engine or motor is shown conventionally at 20 and is mounted on the frame element just referred to, the shaft 21 of the motor driving chain 22 passing over sprocket wheel 23 on rear shaft 24 extending transversely of the machine, and from which movement is imparted to the operative elements of the mechanism.

Shaft 24' driven from shaft 24, mounts a bevel gear wheel 25 meshing with pinion 26 on longitudinal shaft 27. The shaft last named includes a universal joint 28, relatively slidable elements 29 and 30, non-rotatable with reference to each other, the element 30 having connection with universal joint 31, and the latter being connected with shaft 32 carrying at its forward end an eccentric 33 imparting movement to link 34 and thence to cutting blade 35. The stationary blade is designated 36 and is mounted on transverse element 37 of a lower and inner frame 38 mounting a stalk receiving device or conveyor 39 passing over rolls 40 and 41. Movement is imparted to this conveyor by means of chain 44, sprocket wheel 45 and shaft 46. The latter carries a sprocket wheel 47 driven by a chain 48 from sprocket wheel 49 and shaft 50, and thru chain 51 from shaft 24', constituting an important element in the rear portion of the drive.

In the rear of conveyor 39 is a series of rolls 55 over which a belt 56 passes, the rolls being of gradually decreasing length and mounted between converging side walls 57 and 58, inclined upwardly and rearwardly. Belt 56 travels also in an inclined path. Upper roll 55' of the series 55 is rigid on shaft 50, and the series is driven by this shaft.

Upper rolls 59', above the plane of belt 56 or the upper run thereof, have their axles 59' loosely mounted in slots 60 of upper extensions 61 of the walls 57 and 58, and are adapted to bear on the material carried rearwardly by series 55 and belt 56.

Sprocket wheels 61 and 62 on shafts 59' are driven by chain 63 from sprocket wheel 64 on shaft 65, the latter carrying gear wheel 66 meshing with gear wheel 67 on shaft 68. Shaft 68 is driven by wheel 69 and chain 70 from shaft 50.

Chain 70 also drives sprocket wheel 71 on shaft 72 of roller 73 over which the stalks pass after being discharged from belt 56.

Rotary element or cutting device 75 on shaft 24 cooperates with stationary blade 77 and operates on the material which then falls, in prepared condition, to the elevating or loading conveyor 78, for discharge to a wagon or truck.

Shaft 24 carries gear wheel 79 meshing with gear wheel 80 on shaft 24', of the cutter drive, to which motion is imparted in the manner indicated. The loading conveyor is inclosed in a housing 82, and the latter has the relation to the main structure clearly apparent from an inspection of Figure 3.

The drive for the loading conveyor 78 is thru gear wheels 85 and 86, the latter being mounted on shaft 87 carrying sprocket wheel 88 driven by a chain 89 from shaft 50.

A reel 90 is mounted on upper forward transverse shaft 91 which has its bearings in the vertical elements 92, these elements being braced by bars 93, and connected with said elements or standards 92 are side walls 94 between which the material passes from the forward stalk receiving and conveying device 39.

Shaft 91 is vertically movable, being carried in slotted portions 91' of standards 92, and in order to provide a flexible drive permitting this vertical movement, the intermediate shaft 94 is specially mounted, being carried in bearings 95 in an H-shaped frame 96, the upper portion of which swingingly engages shaft 91. A lower frame 97 swings with reference to intermediate shaft 94, and lower shaft 98 driven by gear wheels 99, 99' and shaft 100.

An arm 97' connected with lower frame 97 is slidable with reference to holding member 97", and it will be understood that the frame elements 96 and 97 are angularly movable about the axis of intermediate shaft 94, permitting continuous drive on shaft 91 as the latter moves in vertical slots 91', incident to the operation of the machine, and the amount of material on the forward stalk receiving and conveying device 39.

Longitudinal shaft 100 is driven by gear wheels 102, 103, the latter being on transverse shaft 46, driven as before indicated.

Chain and sprocket mechanism including chain 103 drives intermediate shaft 94 from shaft 98 and the intermediate shaft drives shaft 91 thru mechanism including chain 104.

The frame 38 of the conveyor 39 is swingingly mounted on shaft 46, and the elevation of the forward part of the frame, carrying the forward cutting mechanism, is controlled by angle arm 105 and crank lever 106 pivoted at 107 and retained in an adjusted position by engaging element 108 cooperating with segment 109.

Having described the invention what is claimed is:—

1. In a machine of the class described, a main frame, a stalk receiving conveyor mounted therein, knives mounted forwardly of the conveyor, knife mounting means, and devices for raising and lowering the knife mounting means and conveyor, a series of rolls to which material is fed by the conveyor, an endless traveling element surrounding the rolls of the series and having frictional engagement with the rolls, a plurality of vertically movable rolls above the endless element, means for driving one of the rolls of the lower series, means for driving the rolls of the upper series independently of each other and independently of their position with reference to a horizontal plane, and stalk preparing means adjacent to the point of discharge from the rolls.

2. In a machine of the class described, a stalk receiving conveyor, knives mounted forwardly of the conveyor, a series of lower rolls having their axes in an inclined plane extending upwardly from the conveyor and rearwardly therefrom, an endless stalk carrying device having frictional contact with the rolls, vertically movable pressure rolls above the endless element, means for driving the pressure rolls from one of the lower rolls independently of each other and of the vertical movement of said pressure rolls, stalk cutting means receiving material from the rolls, a loading conveyor for receiving material from the stalk cutting means.

3. In a machine of the class described, a stalk receiving conveyor, knives mounted forwardly of the conveyor, a series of lower rolls having their axes in an inclined plane extending upwardly from the conveyor and rearwardly therefrom, an endless stalk carrying device having frictional contact with the rolls, vertically movable pressure rolls above the endless element, means for driving the pressure rolls from one of the lower rolls independently of each other and of the vertical material from the rolls, a transverse shaft for mounting and driving one of the elements of the cutting means adjacent to the rolls, and means for driving the series of rolls first named from this transverse shaft.

In testimony whereof I affix my signature.

FRANK W. PRO.